Oct. 3, 1933.  J. SNEED  1,928,743
BRAKE
Filed Feb. 15, 1929   2 Sheets-Sheet 1
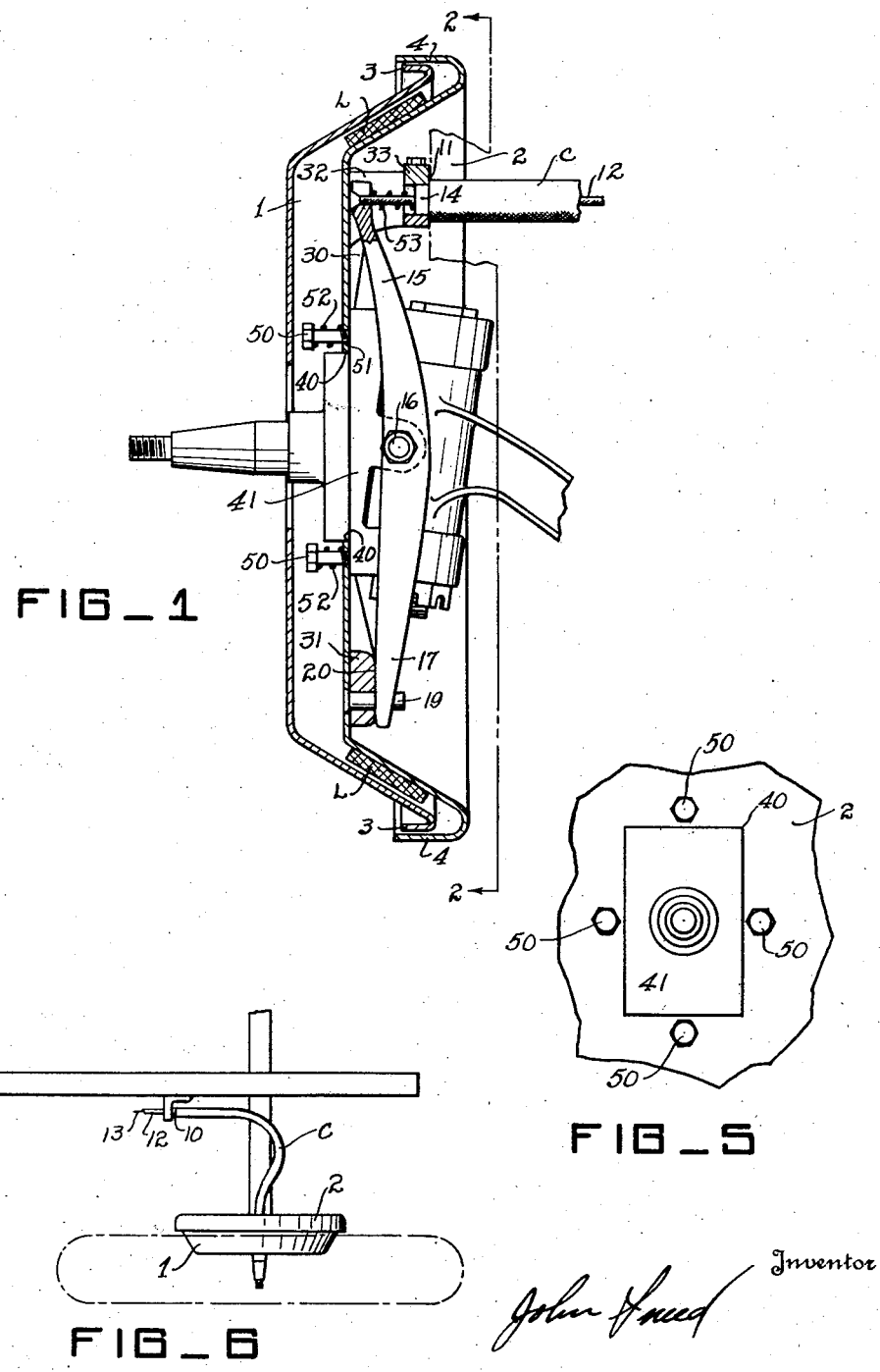
FIG_1
FIG_5
FIG_6
Inventor
John Sneed
By Pate Glick & Teare
Attorneys Oct. 3, 1933.  J. SNEED  1,928,743
BRAKE
Filed Feb. 15, 1929   2 Sheets-Sheet 2
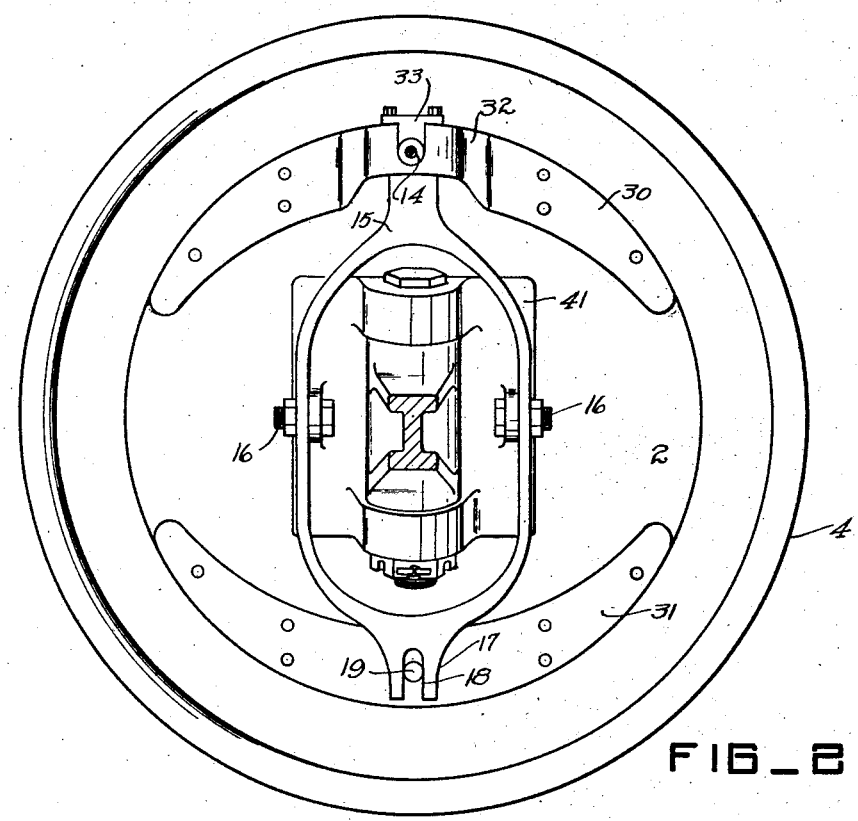
FIG_2
FIG 3
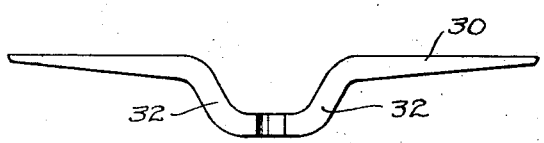
FIG_4

Patented Oct. 3, 1933

1,928,743

UNITED STATES PATENT OFFICE 1,928,743

BRAKE

John Sneed, Ferndale, Mich., assignor to The Midland Steel Products Company, Cleveland, Ohio, a corporation of Ohio Application February 15, 1929. Serial No. 340,061

21 Claims. (Cl. 188—72)

This invention relates to brakes and more particularly to a brake in which the elements move axially with relation to each other and which is adapted for use on motor vehicles particularly the swiveling or steering wheels.

It is among the objects of my invention to provide a brake adapted to be mounted on a swiveling wheel of a motor vehicle in which braking effort is developed between axially moving elements. Another object is to form the brake drum with an inwardly facing conical surface and to arrange a part formed complementary to the drum which may carry suitable friction material and which may be moved axially of the drum, bringing the friction material into contact therewith. A further object is to provide means for anchoring the moving part or shoe to hold it against rotation while permitting axial movement thereof. A still further object is to provide means for moving the shoe axially, which means act with substantial like effects regardless of the angular dispositions of the steering wheels. A further object is to apply axial actuating pressure to the shoe at a plurality of points and distribute the applying force so that substantially uniform pressures are maintained between various parts of the friction surface. A still further object is to apply actuating forces to the moving element through means which permit a mechanical advantage between the brake pull rods and the moving element.

Other objects will appear from the following description of a preferred form of my invention, reference being had to the accompanying drawings. The essential characteristics are summarized in the claims.

In the drawings, Fig. 1 is a partial vertical section taken in a plane normal to a swiveling wheel; Fig. 2 is an elevation of the inner side of the brake; Figs. 3 and 4 illustrate reinforcing elements associated with the moving part or shoe; Fig. 5 is a partial elevation showing the relation between the moving element or shoe and the knuckle upon which it is anchored; and Fig. 6 illustrates the brake associated with one of the swiveling wheels along with part of the actuating mechanism therefor.

Referring to the drawings, I show my brake as comprising essentially two elements, one secured to the wheel and revoluble therewith and the other anchored on the steering knuckle and movable axially into engagement with the first element. For the sake of convenient designation, I shall call the first element the drum 1 and the second element the shoe 2. As illustrated particularly in Fig. 1, the shoe and the drum have complementary and coaxial conical surfaces. I prefer that the shoe carry suitable friction material or lining L. To lend rigidity to the drum its brim may be turned back, as at 3, and to lend rigidity to the shoe and to exclude foreign matter from the brake, its brim may be turned back, as at 4, and preferably so that the brim of the shoe overlaps the brim of the drum when the parts are out of engagement.

To move the shoe into engagement with the drum, I provide means for moving it axially of the knuckle while holding it against rotation. Referring to Figs. 1 and 6, I provide a flexible conduit C which may be secured at one end to the side rail of the vehicle frame, as at 10, and at the other end may be secured or at least abut a part which is fixed to the shoe, as at 11, (see Fig. 1). Freely extending through the conduit is a flexible tension element such as a cable 12 which is connected to a manually or otherwise operable pull rod 13, see Fig. 6. The other end of the cable 12 is secured to the upper end of a lever 15, see also Fig. 2. The lever is formed as a yoke and pivotally mounted in its mid portion on the steering knuckle as at 16. The lower and opposite end 17 of the lever is bifurcated as at 18 and has spaced parts encompassing and extending beyond a pin 19 carried by the shoe. This end of the lever contacts at 20 with a bracket 31 which is fixed to the shoe.

Referring particularly to Figs. 2, 3, and 4, brackets 30 and 31 (see also Fig. 1) are secured to the shoe by such means as rivets and tend to distribute the actuating forces uniformly throughout the shoe. The brackets may have greater cross-section near the vertical axis of the brake and may taper toward their ends to distribute applying force. The upper bracket 30 has an arched or bridge like part 32 within which the upper end of the lever 15 may move when it is drawn by the cable. The end of the conduit C has a reduced part 14 which extends into an opening in the bridge part and the end of the conduit abuts the bridge part of the bracket 30 so that loads in compression, developed in the conduit, are transmitted from it to substantially the upper half of the shoe. A clamp 33 may be removably secured to the upper edge of the bracket 30 adjacent the end of the conduit to facilitate assembly and to secure the parts thereto.

In the operation of the actuating mechanism, tension in the pull rod 13 develops tension in the cable 12 and loads the conduit C in compression.

The compressive load is transmitted to the bracket 30 and the tension in the cable swings the lever 15 clockwise (as viewed in Fig. 1) about the pivot 16 and exerts an axial force on the bracket 31 which is equal and in the same direction as the force delivered onto the bracket 30. It will be noted that since the end 14 of the conduit C moves with the shoe toward the drum and since the end of the cable moves with the lever 15 toward the end of the conduit, that movement of the cable and the pull rod 13 is twice as great as the axial movement of the whole shoe, which gives a mechanical advantage of two to one in favor of the pull rod in developing pressure between the shoe and the drum.

To explain the movement of the free end of the conduit it must first be appreciated that movement results only when the parts are in curvature because the compressive reaction in the conduit is delevoped by the cable tending to fall into a straight line when it is subjected to load in tension. Presuming then that the parts are curved and the cable is loaded in tension the conduit may be likened to the arch of a bridge under load. The ends of the conduit may then be likened to the abutments of which one is free to move. Obviously the vertical load on an arch is resolved into a lateral thrust at the abutment; so with the conduit, the radial reaction which measures the tension in the cable in curvature is resolved into a longitudinal force moving the free end of the conduit lengthwise of the cable.

To anchor the shoe and hold it against rotation, I provide a plurality of means including first the pin 19 which extends through the bifurcated end of the lever 15. Inasmuch as the lever is pivotally mounted at spaced points on the knuckle, it will be appreciated that the lower half of the lever because of its particular shape and manner of support, may well take the braking torque from the shoe and deliver it to the knuckle. If, however, in any particular instance, it is desired to anchor the shoe directly to the knuckle, I prefer to cut a rectangular opening in the shoe, as at 40, (see Fig. 5), to form a rectangular shoulder 41 on the knuckle, which closely fits the opening 40 upon which the shoe may move axially but with relation to which it may not rotate.

For the sake of releasing the brake and for the purpose of further anchorage, if it so be desired, studs 50, (see Figs. 1 and 5), are carried by the knuckle and pass through holes 51 in the shoe. Retractor springs 52 lie between the heads of the studs and the inner face of the shoe and tend to force the shoe away from the drum. It should further be noted that a spring 53 surrounds the cable and lies between the end of the conduit and the upper end of the lever 15, and is arranged to urge the end of the lever toward the shoe and to draw the conduit through the cable to the idle position, illustrated in Fig. 1.

From the foregoing, it will appear that I have provided a brake which is simple in construction, which comprises a minimum of moving parts, which is adaptable for installation on the wheels of a motor vehicle including the swiveling wheels, which may be economically made and readily installed and which is rugged and susceptible to long life and arduous use. While I have illustrated and described a preferred form of my invention, I do not care to be limited thereto in the scope of my patent or in any manner other than by the claims appended hereto.

I claim:—

1. A brake for a wheel carried on a swiveling knuckle comprising a part rotating with the wheel and a non-rotating part carried by the knuckle and movable axially into engagement with the rotating part, a lever pivotally mounted on the knuckle and swingable in a plane normal to the wheel and engaging the non-rotating part at one end, and means connected to the other end of said lever and to the non-rotating part adjacent thereto for exerting equal and opposite forces on the lever and said non-rotating part whereby equal forces applied to it tend to move it axially at or near each end of said lever.

2. A vehicle brake having an axially movable shoe, a lever pivoted in the middle and having its ends at diametrically opposite parts of the shoe, a flexible conduit secured to a fixed part of the vehicle at one end and to the shoe at the other, and a cable passing through the conduit and connected to the lever at one end and to brake operating linkage at the other.

3. In a brake, the combination of a drum, a shoe movable into engagement therewith, a flexible conduit engaging the shoe, a lever pivoted on a fixed part and having one end engaging the shoe, a cable passing through the conduit engaging the other end of the lever.

4. In a brake for a swiveling wheel, the combination of a steering knuckle, a drum carried by the wheel, an axially movable shoe having at least a portion generally surrounding said knuckle, and an operating and torque taking lever having its ends lying adjacent the shoe at diametrically opposite points and having a yoked middle part straddling the knuckle and pivotally secured thereto at spaced points, said lever engaging said shoe and holding it against circumferential movement.

5. In a brake for a swiveling wheel, the combination of a steering knuckle, a drum carried by the wheel, an axially movable shoe having at least a portion generally surrounding said knuckle and anchored thereon, an operating lever having its ends lying adjacent the shoe at diametrically opposite points and having a yoked middle part straddling the knuckle and pivotally secured thereto, and means for drawing one end of the lever away from the shoe to force the other end of the lever onto the shoe.

6. In a brake, the combination of a steering knuckle having horizontally spaced lugs on opposite sides thereof, a yoked lever pivotally connected to said lugs and straddling the body of said knuckle, an axially movable brake shoe and means for swinging said lever and moving said shoe, said lever engaging said shoe and holding it against circumferential movement and transmitting torque to said knuckle.

7. In a brake, the combination of a steering knuckle having horizontally spaced lugs on opposite sides thereof, a yoked lever pivotally connected to said lugs and straddling the body of said knuckle, an axially movable brake shoe engaged by one end of the lever, and means engaging the shoe and the other end of the lever for moving said shoe.

8. A brake comprising an axially movable shoe held against rotation, a flexible incompressible member arranged to transmit an axial force against said shoe, and means associated with said member for actuating it to move said shoe axially.

9. A brake comprising an axially movable shoe held against rotation, a flexible incompressible member arranged to transmit an axial force against said shoe, and means including a cable encompassed by said member for actuating it to move said shoe axially.

10. A brake having an axially movable shoe, a fixed part, a lever pivotally mounted on said fixed part and extending diametrically across the shoe and engaging said shoe at one end, and means connected to the other end of the lever and to the shoe adjacent thereto for swinging the lever and moving the shoe.

11. A brake comprising a rotating drum and an axially movable shoe, in combination with a steering knuckle relative to which the shoe is movable, a yoked lever pivotally mounted in the steering knuckle and extending diametrically across the face of the shoe and engaging the shoe at one end thereof and holding the shoe against rotation while moving it axially into engagement with the drum.

12. A brake comprising a rotating drum and an axially movable shoe, in combination with a steering knuckle relative to which the shoe is movable, a yoked lever pivotally mounted in the steering knuckle and extending diametrically across the face of the shoe and having a bifurcated end engaging the shoe and a pin carried by the shoe and lying within the bifurcated end of the lever through which braking torque is delivered to said knuckle.

13. A brake for a swiveling wheel mounted on a knuckle comprising a drum carried by the wheel and a shoe carried by the knuckle and movable axially into contact with said drum, said shoe having a plurality of apertures adjacent the knuckle, a plurality of studs carried by the knuckle and passing through said apertures and holding the shoe against rotational movement, and retractor springs carried by said studs and yieldingly forcing said shoe away from said drum.

14. A brake comprising a rotating drum, an axially movable disc like shoe, oppositely placed reinforcing brackets secured to the shoe and means mounted for pivotal movement engaging said brackets at diametrically opposite points for moving said shoe into engagement with the drum.

15. A brake comprising a rotating drum, an axially movable disc like shoe, oppositely placed reinforcing brackets secured to the shoe and means engaging said brackets at diametrically opposite points for moving said shoe into engagement with the drum, each of said brackets having portions of decreasing strength extending away from the points of engagement with said means for uniformly distributing pressure between said shoe and said drum.

16. In a brake, the combination of a circular shoe having a generally conical lining supporting part and a disc like central part, oppositely disposed brackets carried by the shoe secured to the disc like part adjacent the lining supporting part, one of said brackets having a raised bridge portion in the middle thereof, the other of said brackets carrying an anchor pin in the middle thereof and diametrically opposite the said bridge portion of the first named bracket and means for exerting equal forces on the bridge portion of one bracket and on the other bracket adjacent the anchor pin for moving said shoe into engagement with the drum.

17. In a brake, the combination of a circular shoe having a generally conical lining supporting part and a disc like central part, oppositely disposed brackets carried by the shoe secured to the disc like part adjacent the lining supporting part, one of said brackets carrying an anchor pin in the middle thereof through which braking torque is taken, and means for exerting equal forces on said brackets for moving said shoe into engagement with the drum, said means including a swingable member carried by a fixed part and engaging said pin and taking the torque therefrom.

18. In a brake, the combination of a rotating drum, an axially movable non-rotating shoe having a central opening, a fixed part extending through said opening, oppositely disposed load distributing brackets secured to the shoe, one of said brackets having a raised bridge like part, a lever pivotally mounted on said fixed part and having one end lying under the bridge like part of said bracket and having the other end engaging the other bracket at a point diametrically opposite the said bridge like part, and means engaging the bridge like part and the end of the lever adjacent thereto for moving the shoe into engagement with the drum.

19. In a brake, the combination of a rotating drum, an axially movable non-rotating shoe having a central opening, a fixed part extending through said opening, oppositely disposed load distributing brackets secured to the shoe, one of said brackets having a raised bridge-like part, a lever pivotally mounted on said fixed part and having one end lying under the bridge-like part of said bracket and having the other end engaging the other bracket at a point diametrically opposite the said bridge-like part, and a flexible force transmitting device comprising a compression member and a tension member, the compression member being secured to said bridge-like part and the tension member being secured to the end of said lever adjacent thereto.

20. A brake comprising an axially movable friction device, means for imparting an axial thrust to said friction device, said means comprising a flexible incompressible housing adapted to be loaded in compression, and a cable adapted to be loaded in tension.

21. In a brake, the combination of a wheel mounted on a swiveling axis, a brake drum mounted on said wheel, a friction device associated with said brake drum and adapted to be moved axially into co-operation therewith, means for moving said brake shoe which consists in a flexible and incompressible housing and a flexible tension member, said flexible housing adapted to be loaded in compression when said cable is loaded in tension and when said parts are in curvature.

JOHN SNEED.